(12) United States Patent
Lee et al.

(10) Patent No.: US 12,469,642 B2
(45) Date of Patent: Nov. 11, 2025

(54) MULTILAYER ELECTRONIC COMPONENT

(71) Applicant: SAMSUNG ELECTRO-MECHANICS CO., LTD., Suwon-si (KR)

(72) Inventors: Dae Hee Lee, Suwon-si (KR); Seung Min Kang, Suwon-si (KR); Hong Seok Kim, Suwon-si (KR); Chang Hak Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 105 days.

(21) Appl. No.: 18/584,412

(22) Filed: Feb. 22, 2024

(65) Prior Publication Data

US 2024/0312713 A1 Sep. 19, 2024

(30) Foreign Application Priority Data

Mar. 14, 2023 (KR) .................. 10-2023-0033554

(51) Int. Cl.
*H01G 4/224* (2006.01)
*H01G 4/008* (2006.01)
*H01G 4/012* (2006.01)
*H01G 4/12* (2006.01)
*H01G 4/30* (2006.01)

(52) U.S. Cl.
CPC ............. *H01G 4/224* (2013.01); *H01G 4/008* (2013.01); *H01G 4/012* (2013.01); *H01G 4/1209* (2013.01); *H01G 4/30* (2013.01)

(58) Field of Classification Search
CPC ........ H01G 4/224; H01G 4/008; H01G 4/012; H01G 4/1209; H01G 4/30
See application file for complete search history.

(56) References Cited

U.S. PATENT DOCUMENTS

| | | | |
|---|---|---|---|
| 2016/0104578 A1* | 4/2016 | Kang | H01G 4/30 361/301.4 |
| 2017/0178808 A1* | 6/2017 | Shimada | C04B 35/64 |
| 2021/0074479 A1* | 3/2021 | Lee | H01G 4/1227 |
| 2021/0155549 A1* | 5/2021 | Nomura | H01G 4/1254 |
| 2021/0287853 A1 | 9/2021 | Sasabayashi et al. | |

(Continued)

FOREIGN PATENT DOCUMENTS

| | | |
|---|---|---|
| JP | 2021-150300 A | 9/2021 |
| KR | 10-2022-0060347 A | 5/2022 |
| KR | 10-2022-0136140 A | 10/2022 |

*Primary Examiner* — Michael P McFadden
(74) *Attorney, Agent, or Firm* — MORGAN, LEWIS & BOCKIUS LLP

(57) ABSTRACT

A multilayer electronic component includes a body including a dielectric layer including Ba and Ti and an internal electrode alternately disposed with the dielectric layer, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a side margin portion disposed on the fifth and sixth surfaces; and external electrodes disposed on the third and fourth surfaces, wherein the side margin portion includes Sn and a transition metal, and wherein, in the side margin portion, a mole ratio of transition metal to Sn is 10 or more.

16 Claims, 5 Drawing Sheets

(56) References Cited

U.S. PATENT DOCUMENTS

| | | | |
|---|---|---|---|
| 2022/0139632 A1* | 5/2022 | Kim | .......... H01G 4/30 361/321.4 |
| 2022/0223344 A1* | 7/2022 | Jung | .......... H01G 4/012 |
| 2022/0319775 A1 | 10/2022 | Kato | |

* cited by examiner

MULTILAYER ELECTRONIC COMPONENT

CROSS-REFERENCE TO RELATED APPLICATION (S)

This application claims benefit of priority to Korean Patent Application No. 10-2023-0033554 filed on Mar. 14, 2023 in the Korean Intellectual Properties Office, the disclosure of which is incorporated herein by reference in its entirety.

BACKGROUND

1. Technical Field

The present disclosure relates to a multilayer electronic component.

2. Description of the Related Art

A multilayer ceramic capacitor (MLCC), a multilayer electronic component, may be a chip-type condenser mounted on the printed circuit boards of various electronic products such as a liquid crystal display (LCD) and a plasma display panel (PDP), a computer, a smartphone, charging or discharging electricity therein or therefrom.

As electronic products have been designed to have a reduced size, thickness and functionality, chip components have also been required to have a reduced size, and mounting of electronic components has also become highly integrated. In response to this trend, a space between mounted electronic components has also been reduced.

In particular, in the case of a structure in which a side margin portion is formed on a side surface of a body to improve capacitance, it may be highly likely that moisture may penetrate through the side margin portion, such that structural improvement may be necessary to prevent deterioration of insulation resistance due to the moisture penetration.

SUMMARY

An embodiment of the present disclosure is to prevent, when a side margin portion is formed on a side surface of a body, insulation resistance from being deteriorated due to moisture penetration through the side margin portion.

According to an embodiment of the present disclosure, a multilayer electronic component includes a body including (i) a dielectric layer including Ba and Ti and (ii) an internal electrode alternately disposed with the dielectric layer, the body including first and second surfaces opposing each other in a first direction, third and fourth surfaces opposing each other in a second direction and connected to the first and second surfaces, and fifth and sixth surfaces opposing each other in a third direction and connected to the first to fourth surfaces; a side margin portion disposed on the fifth and sixth surfaces; and an external electrode disposed on the third and fourth surfaces, wherein the side margin portion includes Sn and a transition metal, and wherein, in the side margin portion, a mole ratio of the transition metal to Sn is 10 or more.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Figure 1:
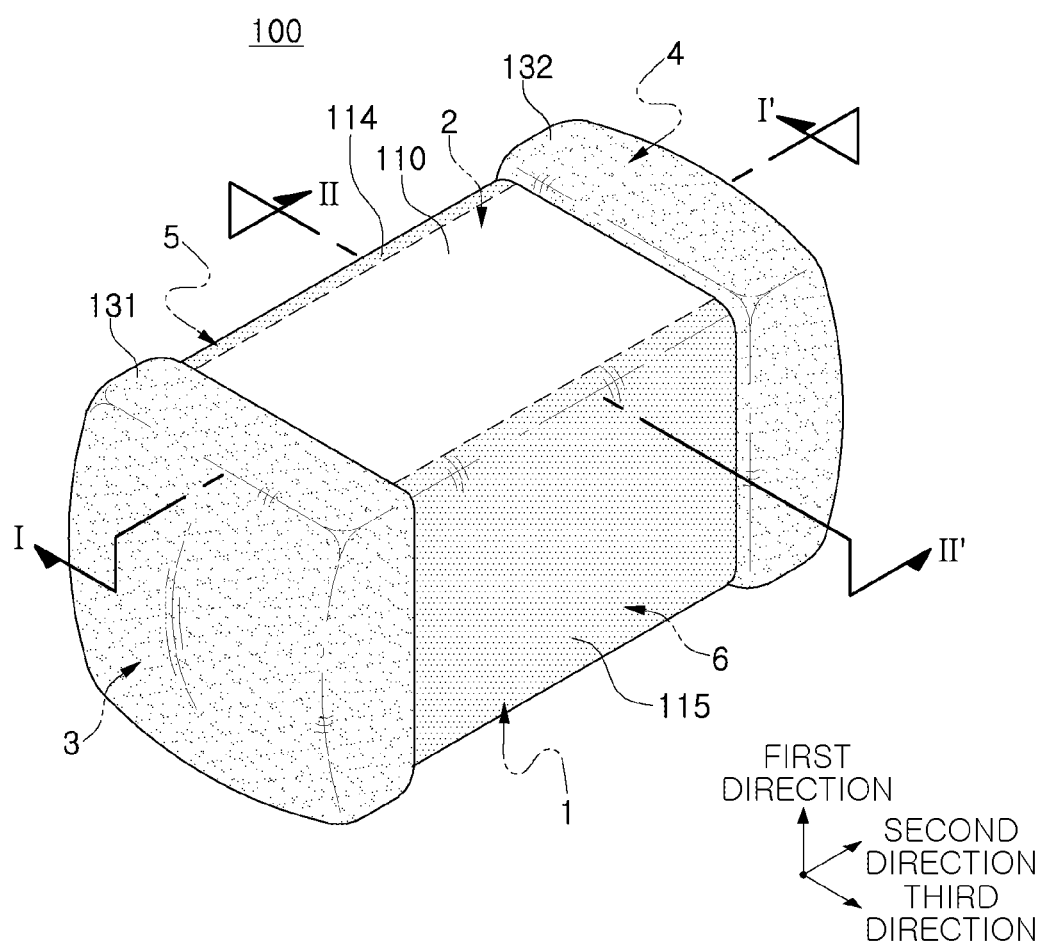
FIG. 1 is a perspective diagram illustrating multilayer electronic component according to an embodiment of the present disclosure.

Hereinafter, embodiments of the present disclosure will be described below with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after a gaining an understanding of the disclosure of this application.

In the drawings, same elements will be indicated by the same reference numerals. Also, redundant descriptions and detailed descriptions of known functions and elements which may unnecessarily render the gist of the present disclosure obscure will not be provided. In the accompanying drawings, some elements may be exaggerated, omitted or briefly illustrated, and the sizes of the elements may not necessarily reflect the actual sizes of these elements. The terms, "include," "comprise," "is configured to," or the like of the description are used to indicate the presence of features, numbers, steps, operations, elements, portions or combination thereof, and may not exclude the possibilities of combination or addition of one or more features, numbers, steps, operations, elements, portions or combination thereof.

FIG. 1 is a perspective diagram illustrating a multilayer electronic component according to an embodiment.

Figure 2:
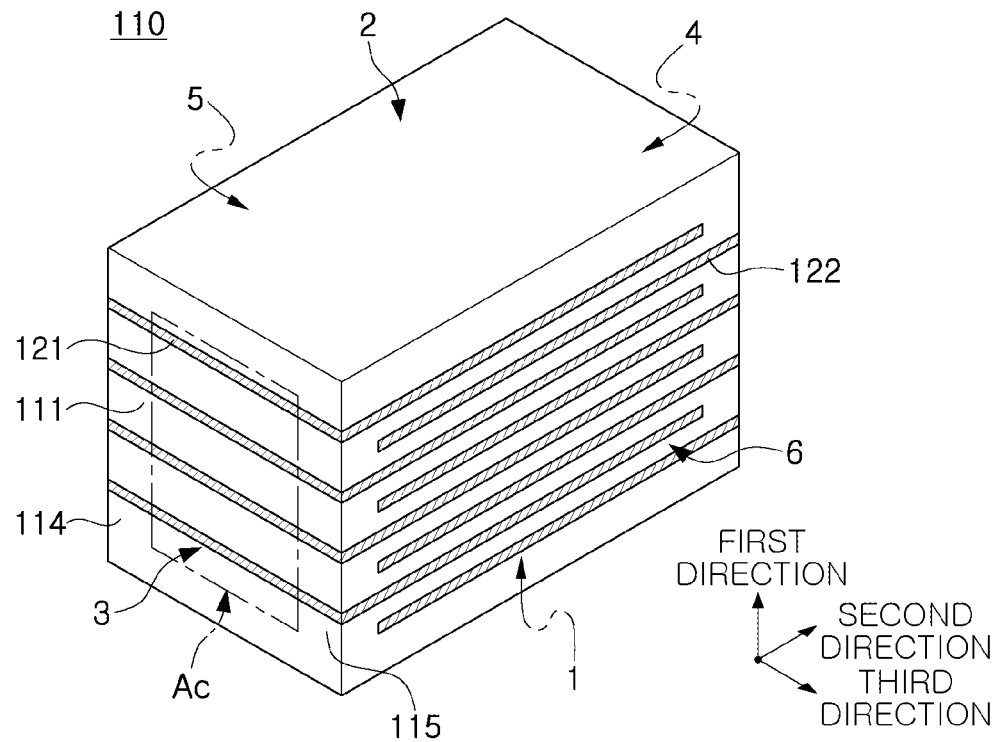
FIG. 2 is a perspective diagram illustrating a body according to an embodiment of the present disclosure.

FIG. 2 is a perspective diagram illustrating a body according to an embodiment.

Figure 3:
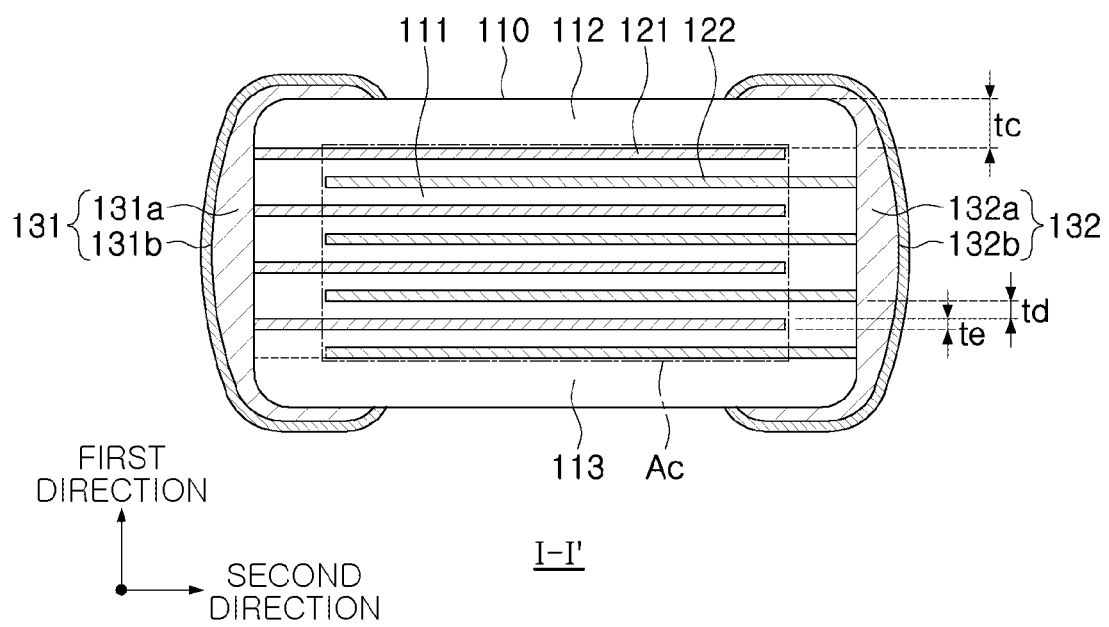
FIG. 3 is a cross-sectional diagram taken along line I-I' in FIG. 1.

FIG. 3 is a cross-sectional diagram taken along line I-I' in FIG. 1.

Figure 4:
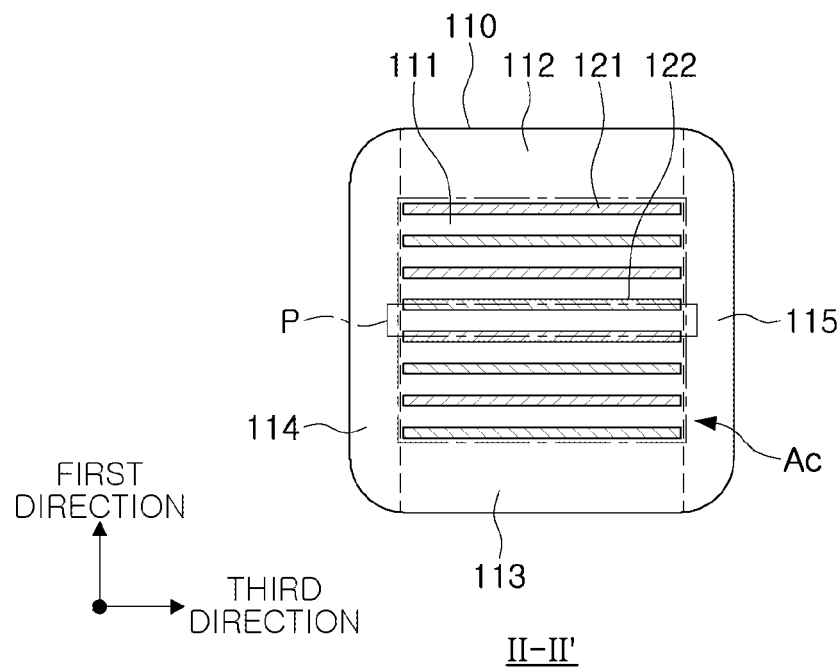
FIG. 4 is a cross-sectional diagram taken along line II-II' in FIG. 1.

FIG. 4 is a cross-sectional diagram taken along line II-II' in FIG. 1.

Figure 5:
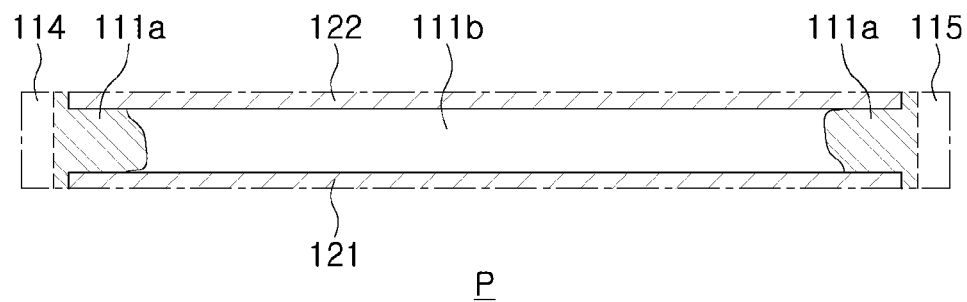
FIG. 5 is an enlarged diagram illustrating region P in FIG. 4 according to an embodiment of the present disclosure.

FIG. 5 is an enlarged diagram illustrating region P in FIG. 4 according to an embodiment.

Figure 6:
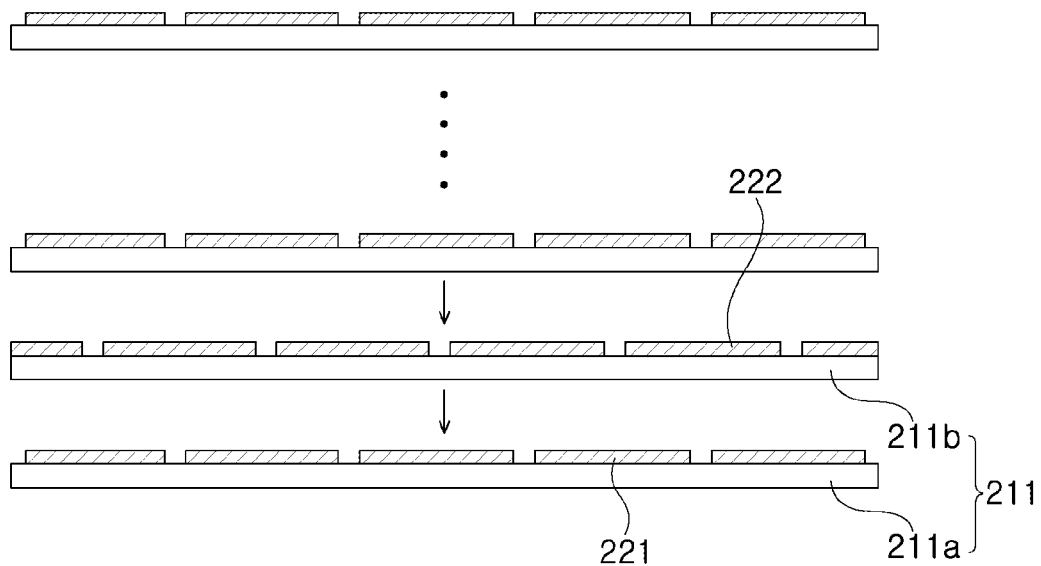
FIGS. 6 to 8 are diagrams illustrating a method of manufacturing a multilayer electronic component according to an embodiment of the present disclosure.
Figure 7:
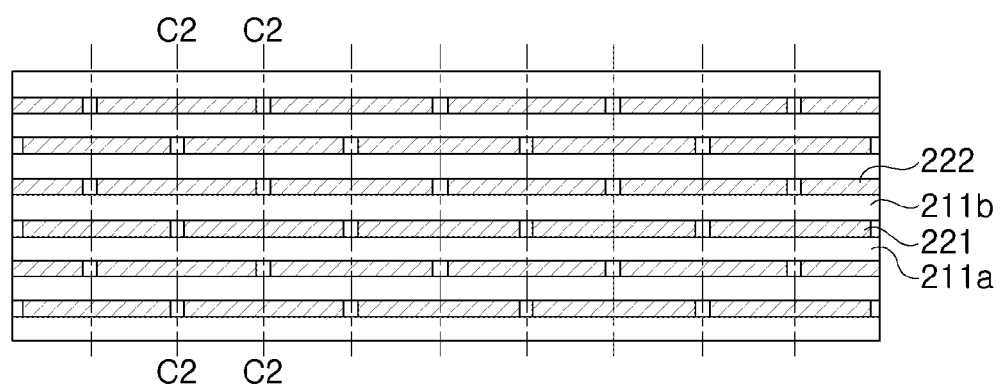
Figure 8:
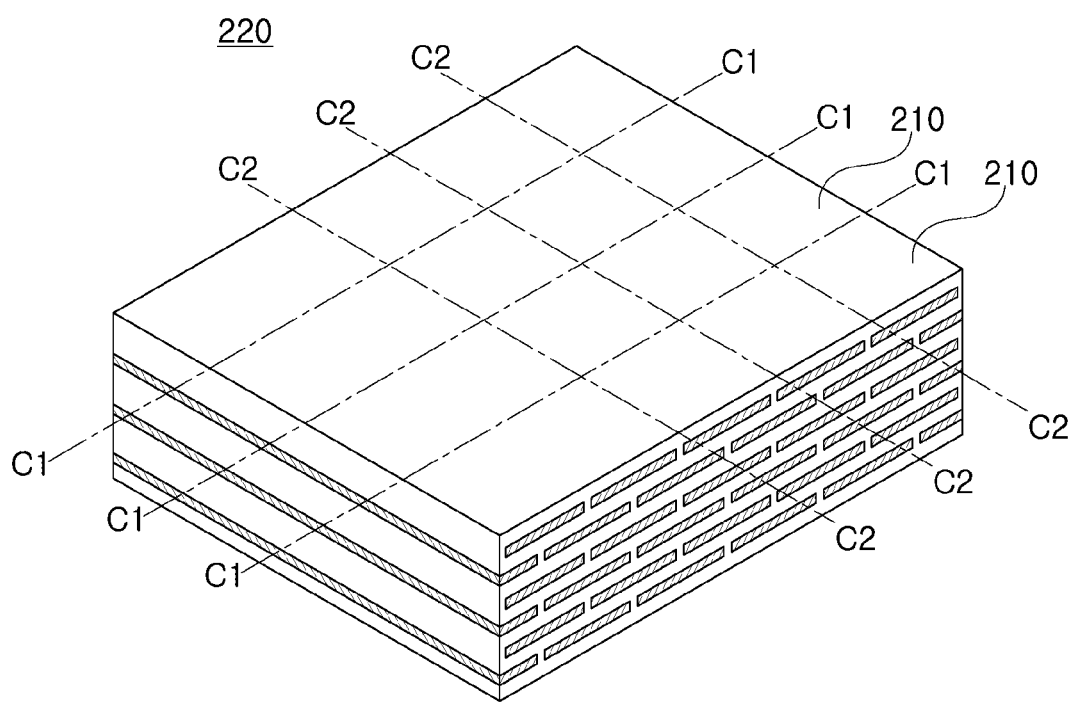

FIGS. 6 to 8 are diagrams illustrating a method of manufacturing a multilayer electronic component according to an embodiment.

Hereinafter, a multilayer electronic component according to an embodiment will be described in greater detail with reference to FIGS. 1 to 8.

In the drawings, a first direction may be defined as a direction in which first and second internal electrodes are alternately disposed with a dielectric layer interposed therebetween or a thickness T direction, among second and third directions perpendicular to the first direction, a second direction may be defined as a length L direction, and a third direction may be defined as a width W direction.

A multilayer electronic component 100 according to an example embodiment may include a dielectric layer 111 and internal electrodes 121 and 122 alternately disposed with the dielectric layer, first and second surfaces 1 and 2 opposing each other in the first direction, third and fourth surfaces 3 and 4 connected to the first and second surfaces and opposing each other in a second direction, and fifth and sixth surfaces 5 and 6 connected to the first to fourth surfaces and opposing each other in a third direction; a side margin portion disposed on the fifth and sixth surfaces; and external electrodes disposed on the third and fourth surfaces, the side margin portion may include Sn and a transition metal, and in the side margin portion, a mole ratio of transition metal to Sn may be 10 or more.

In the body 110, the dielectric layers 111 and internal electrodes 121 and 122 may be alternately laminated.

The shape of the body 110 may not be limited to any particular shape, but as illustrated, the body 110 may have a hexahedral shape or a shape similar to a hexahedral shape. Due to reduction of ceramic powder included in the body 110 during a firing process, the body 110 may not have an exact hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2 and the third and fourth surfaces 3 and 4 and opposing each other in the third direction.

A method of forming the body 110 is not limited to any particular example. For example, as illustrated in FIGS. 6 to 8, the body 110 may be formed by alternately laminating the first ceramic green sheet 211a on which a plurality of parallel first internal electrode patterns 221 are printed and the second ceramic green sheet 211b on which a plurality of parallel second internal electrode patterns 222 are printed, cutting the ceramic green sheet laminate 220 into individual sizes along C1-C1 and C2-C2 cutting lines orthogonal to each other to cross a plurality of stripe-type first internal electrode patterns 221 and stripe-type second internal electrode patterns 222, forming the laminate body 210, and performing firing, or may be formed by attaching the side margin portions 114 and 115, which will be described later, to the side surface of the laminate body 210 and performing firing, but an example embodiment thereof is not limited thereto.

In this case, as illustrated in FIG. 2, to increase capacitance per unit volume of the multilayer electronic component 100 and to reduce a step difference between the ends of the internal electrodes 121 and 122 and the dielectric layer 111, both ends of the internal electrodes 121 and 122 in the third direction may be in contact with the fifth surface 5 and the sixth surface 6 of the body 110, respectively.

The plurality of dielectric layers 111 forming the body 110 may be in a fired state, and a boundary between the adjacent dielectric layers 111 may be integrated with each other such that the boundary may not be distinct without using a scanning electron microscope (SEM).

In an embodiment, a raw material for forming the dielectric layer 111 is not limited to any particular example as long as sufficient capacitance may be obtained. For example, a barium titanate-based material, a lead composite perovskite-based material, or a strontium titanate-based material may be used. The barium titanate material may include $BaTiO_3$ ceramic powder, and an example of the ceramic powder may include $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$ or $Ba(Ti_{1-y}Zr_y)O_3$ $(0<y<1)$ in which Ca (calcium), Zr (zirconium) is partially solid-solute.

Also, various ceramic additives, organic solvents, binders, dispersants, or the like, may be added to a raw material for forming the dielectric layer 111 in the embodiment to powder such as barium titanate ($BaTiO_3$).

The average thickness td of the dielectric layer 111 may not be limited to any particular example.

When the dielectric layer is formed to have a thickness of less than 0.6μ, in particular, when the thickness of the dielectric layer is 0.35 μm or less, reliability of the multilayer electronic component 100 may be deteriorated.

According to an example embodiment, in the side margin portions 114 and 115, a ratio of the transition metal content to the Sn content may be adjusted to 10 or more such that deterioration of insulation resistance of the dielectric layer including Ba and Ti may be prevented even under a wet environment, and moisture resistance reliability may be improved. Accordingly, even when an average thickness te of the dielectric layer 111 is 0.35 μm or less, excellent moisture resistance reliability of the multilayer electronic component 100 may be assured.

Accordingly, when the average thickness td of the dielectric layer 111 is 0.35 μm or less, the effect according to the example embodiment may be prominent, and miniaturization and high capacitance of the multilayer electronic component 100 may be obtained easily.

The average thickness td of the dielectric layer 111 may refer to the average size of the dielectric layer 111 disposed between the first and second internal electrodes 121 and 122 in the first direction. When the body 110 includes a plurality of dielectric layers 111, the average thickness td of the dielectric layer 111 may refer to the average thickness of at least one of the plurality of dielectric layers 111.

The average thickness td of the dielectric layer 111 may be measured by scanning a cross-section of the body 110 in the length and thickness directions (L-T) using a scanning electron microscope (SEM) with a magnification of 10,000. More specifically, an average value may be measured from the thicknesses of the dielectric layer 111 at 30 points spaced apart by an equal distance in the length direction in the scanned image. The 30 points at equal distances may be designated in the active portion Ac. Also, when the average value is measured by extending the measurement of the average value to ten dielectric layers 111, the average thickness of the dielectric layer 111 may be further generalized. Other methods and/or tools appreciated by one of ordinary skill in the art, even if not described in the present disclosure, may also be used.

Referring to FIGS. 2 to 4, the body 110 may include a capacitance forming portion Ac disposed in the body 110, which may be a region in which first and second internal electrodes 121 and 122 overlap in the first direction.

The capacitance forming portion Ac may contribute to capacitance formation of a capacitor, and may be formed by repeatedly laminating a plurality of first and second internal electrodes 121 and 122 with a dielectric layer 111 interposed therebetween.

An upper cover portion 112 may be disposed on one surface of the capacitance forming portion Ac in the first direction, and a lower cover portion 113 may be included on the other surface of the capacitance forming portion Ac in the first direction.

The upper cover portion 112 and the lower cover portion 113 may be formed by laminating a single dielectric layer or two or more dielectric layers on the upper and lower surfaces of the capacitance forming portion Ac in the thickness direction, respectively, and may prevent damages to the internal electrode due to physical or chemical stress.

The upper cover portion 112 and the lower cover portion 113 may not include internal electrodes and may include the same material as that of the dielectric layer 111.

That is, the upper cover portion 112 and the lower cover portion 113 may include a ceramic material, for example, a barium titanate ($BaTiO_3$) ceramic material.

The average thickness of the cover portion 112 and 113 may not be limited to any particular example. However, to easily obtain miniaturization and high capacitance of the multilayer electronic component, the average thickness tc of the cover portions 112 and 113 may be 15 µm or less. Here, the average thickness of the cover portions 112 and 113 may refer to the average thickness of each of the first cover portion 112 and the second cover portion 113.

The average thickness of the cover portions 112 and 113 may refer to the size in the first direction, and may be a value obtained by averaging the size of the cover portion 112 and 113 in the first direction measured at 5 points spaced apart by an equal distance in the upper or lower portions of the capacitance forming portion Ac.

The internal electrodes 121 and 122 may be alternately laminated with the dielectric layer 111.

The internal electrodes 121 and 122 may include a first internal electrode 121 and a second internal electrode 122. The first and second internal electrodes 121 and 122 may be alternately disposed to oppose each other with the dielectric layer 111 included in the body 110 interposed therebetween, and may be connected to the third and fourth surfaces 3 and 4 of the body 110, respectively. Specifically, one end of the first internal electrode 121 may be connected to the third surface, and one end of the second internal electrode 122 may be connected to the fourth surface. That is, in an embodiment, the internal electrodes 121 and 122 may be in contact with the third surface 3 or the fourth surface 4.

As illustrated in FIG. 2, the first internal electrode 121 may be spaced apart from the fourth surface 4 and may be exposed through the third surface 3, and the second internal electrode 122 may be spaced apart from the third surface 3 and may be exposed through the fourth surface 4. The first external electrode 131 may be disposed on the third surface 3 of the body 110 and may be connected to the first internal electrode 121, and the second external electrode 132 may be disposed on the fourth surface 4 of the body 110 and may be connected to the second internal electrode 122.

That is, the first internal electrode 121 may be connected to the first external electrode 131 without being connected to the second external electrode 132, and the second internal electrode 122 may be connected to the second external electrode 132 without being connected to the first external electrode 131. Accordingly, the first internal electrode 121 may be formed to be spaced apart from the fourth surface 4 by a predetermined distance, and the second internal electrode 122 may be formed to be spaced apart from the third surface 3 by a predetermined distance. In this case, the first and second internal electrodes 121 and 122 may be electrically separated from each other by the dielectric layer 111 interposed therebetween.

Also, as described above, to increase capacitance per unit volume of the multilayer electronic component 100 and to reduce a step difference between the ends of the internal electrodes 121 and 122 and the dielectric layer 111, both ends of the internal electrodes 121 and 122 in the third direction may be in contact with the fifth surface 5 and the sixth surface 6 of the body 110, respectively.

The material for forming the internal electrodes 121 and 122 is not limited to any particular example, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Also, the internal electrodes 121 and 122 may be formed by printing conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on a ceramic green sheet. A screen-printing method or a gravure printing method may be used as a method of printing the conductive paste for internal electrodes, but an example embodiment thereof is not limited thereto.

The average thickness te of the internal electrodes 121 and 122 is not limited to any particular example.

However, when the internal electrode is formed to have a thickness of less than 0.6 µm, particularly when the thickness of the internal electrode is 0.35 µm or less, reliability of the multilayer electronic component 100 may be problematic.

In the example embodiment, in the side margin portion 114 and 115, the ratio of the transition metal content to the Sn content may be adjusted to 10 or more to prevent deterioration of the insulation resistance of the dielectric layer including Ba and Ti even under a wet environment, thereby improving moisture resistance reliability. Accordingly, even when the average thickness te of the internal electrodes 121 and 122 is 0.35 µm or less, excellent moisture resistance reliability of the multilayer electronic component 100 may be assured.

Accordingly, when the average thickness te of the internal electrodes 121 and 122 is 0.35 µm or less, the effect according to the example embodiment may be more prominent, and miniaturization and high capacitance of the multilayer electronic component 100 may be easily obtained.

The average thickness te of the internal electrodes 121 and 122 may refer to the average thickness te of the internal electrodes 121 and 122. When the body 110 includes a plurality of internal electrodes 121 and 122, the average thickness td of the internal electrodes 121 and 122 may refer to the average thickness of at least one of the plurality of internal electrodes 121 and 122.

The average thickness te of the internal electrodes 121 and 122 may be measured by scanning a cross-section of the body 110 in the length and thickness direction (L-T) using a scanning electron microscope (SEM) with a magnification of 10,000. More specifically, an average value may be measured from the thicknesses of the internal electrodes 121 and 122 at 30 points spaced apart by an equal distance in the second direction in the scanned image. The 30 points at equal distances may be designated in the active portion Ac. Also, when the average value is measured by extending the measurement of the average value to ten internal electrodes 121 and 122, the average thickness of the internal electrodes 121 and 122 may be further generalized. Other methods and/or tools appreciated by one of ordinary skill in the art, even if not described in the present disclosure, may also be used.

Referring to FIGS. 1 and 4, side margin portions 114 and 115 may be disposed on the fifth and sixth surfaces 5 and 6 of the body 110.

The side margin portions 114 and 115 may basically serve to prevent damage to the internal electrode due to physical or chemical stress.

The method of forming the side margin portions 114 and 115 is not limited to any particular example. For example, the side margin portions 114 and 115 may be formed by applying a ceramic slurry for forming a side margin portion to the side surface of the laminate body 210 and performing firing, or by pressing and attaching a ceramic green sheet for forming a side margin portion and performing firing. The material forming the side margin portions 114 and 115 is not limited to any particular example, and may be formed of the same material as that of the dielectric layer 111, but an example embodiment thereof is not limited thereto. When being formed of a different material from that of the dielectric layer 111, the side margin portions 114 and 115 may have a different composition.

Widths of the side margin portions 114 and 115 is not limited to any particular example. However, to easily obtain miniaturization and high capacitance of multilayer electronic components, an average width of the side margin portions 114 and 115 may be 20 μm or less or 15 μm or less. Also, according to an example embodiment, in the side margin portions 114 and 115, the ratio of the transition metal content to the Sn content may be adjusted to 10 or more to suppress deterioration of the insulation resistance of the dielectric layer including Ba and Ti even under a wet environment, thereby improving moisture resistance reliability. Accordingly, even when the average width of the side margin portions 114 and 115 is 20 μm or less or 15 μm or less, excellent reliability may be assured. The average width of the side margin portions 114 and 115 may refer to the average size of the side margin portions 114 and 115 in the third direction, and may be an average value of the side margin portions 114 and 115 in the third direction measured at five points at equal distances on the side surface of the capacitance forming portion Ac. The width may be measured with a microscope such as a scanning electron microscope. Other methods and/or tools appreciated by one of ordinary skill in the art, even if not described in the present disclosure, may also be used.

According to an example embodiment, the side margin portions 114 and 115 may include Sn and a transition metal.

In the conventional case, Sn may be included in the side margin portion to realize high toughness by forming dielectric grains in the side margin portion to have a reduced size.

However, when the side margin portion is damaged by an external impact, moisture may penetrate into the damaged area and may affect the dielectric layer 111 included in the capacitance forming portion Ac, such that there may be limitations in fundamentally blocking deterioration of the insulation resistance of the dielectric layer 111 in a wet environment.

Accordingly, the side margin portions 114 and 115 according to an example embodiment may further include a transition metal in addition to Sn, thereby suppressing deterioration of the insulation resistance of the dielectric layer 111 even in a wet environment, thereby improving moisture resistance reliability of the multilayer electronic component 100.

When a mole ratio of the transition metal to Sn in the side margin portions 114 and 115 is less than 10, the effect of suppressing insulation resistance of the dielectric layer 111 by trapping holes in the ceramic of the dielectric layer 111, which will be described later, may not be sufficient. Accordingly, as in an example embodiment, a mole ratio of the transition metal to Sn in the side margin portions 114 and 115 may be preferably 10 or more, and accordingly, moisture resistance of reliability the multilayer electronic component 100 may be significantly improved.

An upper limit value of a mole ratio of transition metal to Sn in the side margin portions 114 and 115 is not limited to any particular example, but since excessive addition of transition metal may cause deterioration of reliability of the dielectric layer due to creation of oxygen vacancies, the upper limit may be 25 or less preferably.

The type of transition metal included in the side margin portions 114 and 115 is not limited to any particular example. For example, the transition metal may be one or more of Mn, Co, V, Ni, Fe and alloys thereof.

To improve strength and toughness of the side margin portions 114 and 115, the Sn content included in the side margin portions 114 and 115 may be adjusted. In this case, the side margin portions 114 and 115 may further include Ba and Ti, and the Sn content in the side margin portions 114 and 115 may be preferably 0.1 mole to 3.0 moles based on 100 moles of Ba. When the Sn content in the side margin portions 114 and 115 is less than 0.1 mole based on 100 moles of Ba, it may be difficult to obtain a practical effect by adding Sn, and when the Sn content in the side margin portions 114 and 115 exceeds 3.0 moles based on 100 moles Ba, deterioration of impact resistance may be an issue due to network formation between Sn and excessive suppression of grain growth of the dielectric layer.

The side margin portions 114 and 115 may include one or more dielectric grains having a core-shell structure. In this case, in a shell portion of the core-shell structure, a portion of Ti may be substituted with Sn, and grain growth of dielectric grains in the side margin portions 114 and 115 may be suppressed due to the substituted Sn. Accordingly, density of the side margin portions 114 and 115 may be improved.

A method of measuring a mole ratio of transition metal to Sn included in the side margin portion and/or the dielectric layer 111 is not limited to any particular example. For example, the central portion of the multilayer electronic component 100 in the second direction may be polished to expose cross-sections in the first and third direction, the average value of contents of Sn and a transition metal may be measured through Scanning Electron Microscope Energy-Dispersive X-ray spectroscopy (SEM-EDX) analysis in five or more 5 μm×5 μm regions of the side margin portions 114 and 115 spaced in the first direction, and the average value of the mole ratio of transition metal based on Sn may be calculated. In this case, the content of each element may be measured in at % or mol %. Other methods and/or tools appreciated by one of ordinary skill in the art, even if not described in the present disclosure, may also be used.

As described above, the dielectric layer 111 may be formed of a $BaTiO_3$ ceramic material, such that the dielectric layer 111 may include Ba and Ti. In this case, when external moisture penetrates into the dielectric layer 111, insulation resistance of the dielectric layer 111 may be reversibly deteriorated in a hydrated state.

Since hydration of the dielectric ceramic of the dielectric layer 111 including Ba and Ti may be reversible and may consume holes (h˙ in the formula 1 below) as illustrated below, when the dielectric ceramic has n-type properties, insulation resistance may deteriorate in a wet environment, whereas, when the dielectric ceramic has p-type properties, insulation resistance may increase under a wet environment.

$$H_2O + 2O_O^x + 2h\dot{} \rightleftharpoons 2OH_O\dot{} + \frac{1}{2}O_2 \quad \text{[Formula 1]}$$

In an example embodiment, the dielectric layer 111 may further include one or more of Dy, Ho, Tb, La, Yb and Er. Accordingly, by reducing the average grain size of dielectric grains included in the dielectric layer 111, the dielectric constant may be improved, and high temperature reliability may also be improved. However, when the dielectric layer 111 further includes one or more additives such as Dy, Ho, Tb, La, Yb and Er and has n-type properties, described insulation may above, resistance be as deteriorated due to hydration of the dielectric ceramic of dielectric layer 111. However, according to an example embodiment, since the side margin portions 114 and 115 include Sn and a transition metal, and in the side margin portions 114 and 115, a mole ratio of the transition metal to Sn is 10 or more, even when the dielectric layer 111 includes one or more of Dy, Ho, Tb, La, Yb and Er, insulation resistance may be prevented from deteriorating in a hydrated state.

Specifically, when moisture penetrates into the capacitance forming portion Ac, holes in the dielectric ceramic may be consumed at an end of the dielectric layer 111 in the third direction and hydration occurs, which may deteriorate insulation resistance. However, when the side margin portions 114 and 115 are disposed on the fifth and sixth surfaces 5 and 6 of the body 110 as in an example embodiment, the transition metal included in the side margin portions 114 and 115 may trap holes in the dielectric ceramic of the dielectric layer 111 and may prevent hydration reaction. Accordingly, moisture resistance reliability of the multilayer electronic component 100 may be significantly improved.

In an example embodiment, the dielectric layer 111 may include a transition metal. In this case, the transition metal included in the dielectric layer 111 may be formed by diffusion of the transition metal element included in the side margin portions 114 and 115 to both ends of the dielectric layer 111 in the third direction. Accordingly, a transition metal may be included in both ends of the dielectric layer 111 in the third direction, which is a portion vulnerable to moisture penetration, deterioration of insulation resistance of the dielectric layer 111 may be suppressed.

In this case, referring to FIG. 5, in an example embodiment, due to the transition metal diffused to both ends of the dielectric layer 111 in the third direction, the dielectric layer 111 may be divided into a first region 111a, which is a region adjacent to the fifth surface and sixth surface, and a second region 111b disposed between the first regions 111a, and a mole ratio of the transition metal to Ba included in the first region 111a may be higher than a mole ratio of the transition metal to Ba included in the second region 111b. Accordingly, oxygen vacancies may occur throughout the dielectric layer 111 region, such that deterioration of reliability may be prevented, and by trapping holes in the first region 111a, which is vulnerable to moisture penetration, moisture resistance reliability of the entire multilayer electronic component 100 may be improved. A method of measuring a mole ratio of the transition metal to Ba may be essentially similar to the method of measuring the mole ratio of the transition metal to Sn.

When the transition metal content in the dielectric layer 111 including Ba and Ti is excessive, concentration of oxygen vacancies may increase and reliability may be deteriorated. Accordingly, rather than controlling the content of the transition metal in the entire region of the dielectric layer 111, forming a high content of the transition metal only in the region adjacent to both ends of the dielectric layer 111 in the third direction may maintain moisture resistance reliability and may reduce the concentration of oxygen vacancies in the entire dielectric layer 111. In other words, it may be desirable to appropriately control the degree of formation of the first region 111a of the dielectric layer. Preferably, the average size of the first region 111a in the third direction may be 50 μm or less.

The method of distinguishing between the first region 111a and the second region 111b is not limited to any particular example. For example, in the first and third direction cross-section polished to the central portion of the multilayer electronic component 100 in second direction, the transition metal content may be measured through Scanning Electron Microscope Energy-Dispersive X-ray spectroscopy (SEM-EDX) analysis from end of any dielectric layer in the third direction to the central portion in the third direction, and the region having a high transition metal content may be classified as the first region 111a, and the region having a low transition metal content may be classified as the second region 111b. In this case, when the dielectric layer 111 additionally includes Sn, the region having a mole ratio of transition metal to Sn of 10 or more at both ends of the dielectric layer 111 in the third direction may be classified as the first region 111a, and the other regions may be classified as the second region 111b. In this case, the size in the third direction from both ends of the dielectric layer 111 to the point at which a mole ratio of the transition metal to Sn decreases to less than 10 may be measured, and an average value may be obtained by repeating this measurement in five or more dielectric layers 111, thereby measuring the average size of the first region 111a in the third direction.

A transition metal included in the dielectric layer 111 may be dissolved in the dielectric ceramic of the dielectric layer 111 and may create holes in the lattice, and by increasing trap energy, a transition metal may improve reliability of the multilayer electronic component 100. However, when the dielectric layer 111 includes an excessive amount of transition metal, a concentration of oxygen vacancies may increase and reliability may be deteriorated. Accordingly, in an example embodiment, rather than controlling only the content of the transition metal included in the dielectric layer 111, by adjusting the mole ratio of transition metal to Sn in the side margin portions 114 and 115 to be higher than the mole ratio of transition metal to Sn in dielectric layer 111, the transition metal may be concentrated and distributed on the side margin portions 114 and 115 and both ends of the dielectric layer 111 in the third direction, which do not contribute to formation of electrostatic capacitance, such that deterioration of the insulation resistance of the dielectric layer 111 may be suppressed and high temperature reliability of the multilayer electronic component 100 may be improved.

In an example embodiment, the dielectric layer 111 and the side margin portions 114 and 115 may include dielectric grains, and the average grain size of the dielectric grains in the side margin portions 114 and 115 may be smaller than the average grain size of the dielectric grain in dielectric layer 111. Accordingly, the side margin portions 114 and 115 may have higher moisture resistance and toughness than those of the dielectric layer 111. Accordingly, moisture resistance reliability of the multilayer electronic component 100 may be improved and cracks may be prevented. The grain size may be measured from a micrograph obtained from a microscope such as a scanning electron microscope. Other methods and/or tools appreciated by one of ordinary skill in the art, even if not described in the present disclosure, may also be used.

The external electrodes 131 and 132 may be disposed on the body 110. Specifically, the external electrodes 131 and 132 may include the first and second external electrodes 131 and 132 disposed on the third and fourth surfaces 3 and 4 of the body 110, respectively, and connected to the first and second internal electrodes 121 and 122, respectively.

In the embodiment, the multilayer electronic component 100 may have two external electrodes 131 and 132, but the number and shape of the external electrodes 131 and 132 may be varied depending on the internal electrodes 121 and 122 or for other purposes.

The external electrodes 131 and 132 may be formed of any material having electrical conductivity, such as metal, and a specific material may be determined in consideration of electrical properties and structural stability, and the external electrodes 131 and 132 may have a multilayer structure.

For example, the external electrodes 131 and 132 may include electrode layers disposed on the body 110 and plating layers disposed on the electrode layers 131a and 132a.

For a more specific example of the electrode layers, the electrode layers may be sintered electrodes including a first conductive metal and glass, or a resin-based electrode including a conductive metal and resin.

Also, the electrode layers 131a and 132a may have a form in which a plastic electrode and a resin-based electrode are formed in order on the body. Also, the electrode layers 131a and 132a may be formed by transferring a sheet including a conductive metal onto a body or by transferring a sheet including a conductive metal onto a fired electrode.

A material having excellent electrical conductivity may be used as the conductive metal included in the electrode layers 131a and 132a. For example, the conductive metal may be one or more of nickel (Ni), copper (Cu), and alloys thereof.

The plating layers may improve sealing or mounting properties. The type of the plating layers is not limited to any particular example, and a plating layer including at least one of Ni, Sn, Pd, and alloys thereof, and may include a plurality of layers.

For a more specific example of the plating layers 131c and 132c, the plating layers may be Ni plating layers or Sn plating layers, and Ni plating layers and Sn plating layers may be formed in order on the electrode layers, and a Sn plating layer, a Ni plating layer, and a Sn plating layer may be formed in order. Also, the plating layers may include a plurality of Ni plating layers and/or a plurality of Sn plating layers.

EMBODIMENT

In this embodiment, samples were manufactured to have a mole ratio of transition metal to Sn included in the side margin portion of 1.0, 5.0, and 10.0 times.

Specifically, a ceramic green sheet for forming a side margin portion was attached to the side surface of the laminate body 210, thermally compressed at a temperature of 50° C. to 120° C., and sintered in a hydrogen atmosphere. Thereafter, an external electrode including Cu was fired, and a plating layer including Ni and a plating layer including Sn were formed in that order.

Table 1 below illustrates the results of moisture resistance reliability evaluation conducted on 1200 samples for each test number. In the moisture resistance reliability evaluation, a sample in which insulation resistance A decreased by more than $10^7$ times the initial insulation resistance value after applying a voltage of 4 V for 1 hour at 85° C. and 85% relative humidity was determined to be defective.

TABLE 1

| Test No. | Mole ratio of transition metal to Sn | Moisture resistance defect rate (number of defective products/number of samples)) |
| --- | --- | --- |
| 1 | 1.0 | 1,667 ppm (2/1,200) |
| 2 | 5.0 | 833 ppm (1/1,200) |
| 3 | 10.0 | 0 ppm (0/1,200) |

As for the results in Table 1 above, Mn was used as the transition metal. Co, V, Ni, and Fe, either individually or in combination, may also be used as the transition metal.

Referring to test numbers 1 and 2, when a mole ratio of the transition metal to Sn included in the side margin portion was less than 10.0, the effect of improvement of moisture resistance reliability increased as a mole ratio of the transition metal to Sn increased, but the effect was insufficient.

In test number 3 in which a mole ratio of transition metal to Sn included in the side margin portion was 10.0, the moisture resistance defect rate was 0 ppm, and the effect of improving moisture resistance reliability was significant. Accordingly, when a mole ratio of the transition metal to Sn included in the side margin portion was 10.0 or more as in an embodiment, moisture resistance reliability of the multilayer electronic component may be significantly improved.

According to the aforementioned embodiments, by trapping holes in the side margin portion and preventing hydration by adjusting the ratio of transition metal content to Sn content included in the side margin portion to 10 or more, hydration reversible deterioration of insulation resistance may be prevented.

While the embodiments have been illustrated and described above, it will be configured as apparent to those skilled in the art that modifications and variations could be made without departing from the scope of the present disclosure as defined by the appended claims.

What is claimed is:

1. A multilayer electronic component, comprising:
a body including (i) a dielectric layer including Ba and Ti and (ii) an internal electrode alternately disposed with the dielectric layer, the body including first and second surfaces opposing each other in a first direction, third and fourth surfaces opposing each other in a second direction and connected to the first and second surfaces, and fifth and sixth surfaces opposing each other in a third direction and connected to the first to fourth surfaces;
a side margin portion disposed on the fifth and sixth surfaces; and
an external electrode disposed on the third and fourth surfaces,
wherein the side margin portion includes Sn and a transition metal, and
wherein, in the side margin portion, a mole ratio of the transition metal to Sn is 10 or more.

2. The multilayer electronic component of claim 1,
wherein the dielectric layer further includes the transition metal,
wherein, the dielectric layer comprises a first region adjacent to the fifth surface and the sixth surface, and a second region disposed between two first region, a mole ratio of the transition metal to Ba included in the first region is higher than a mole ratio of the transition metal to Ba included in the second region.

3. The multilayer electronic component of claim 2, wherein an average size of the first region in the third direction is less than 50 μm.

4. The multilayer electronic component of claim 1, wherein the dielectric layer further includes Sn and the transition metal, and comprises one or more regions on both ends of the dielectric layer in the third direction, and wherein a mole ratio of the transition metal to Sn in the one or more regions is 10 or more.

5. The multilayer electronic component of claim 1, wherein the dielectric layer further includes one or more of Dy, Ho, Tb, La, Yb, and Er.

6. The multilayer electronic component of claim 1, wherein the transition metal is one or more of Mn, Co, V, Ni, Fe, and alloys thereof.

7. The multilayer electronic component of claim 1,
wherein the side margin portion further includes Ba and Ti, and
wherein, in the side margin portion, a Sn content is 0.1 mole or more and 3.0 moles or less based on 100 moles of Ba.

8. The multilayer electronic component of claim 1,
wherein the dielectric layer further includes Sn and the transition metal, and
wherein the mole ratio of the transition metal to Sn in the side margin portion is higher than a mole ratio of the transition metal to Sn in the dielectric layer.

9. The multilayer electronic component of claim 1,
wherein the dielectric layer and the side margin portion include dielectric grains, and
wherein an average grain size of the dielectric grains in the side margin portion is smaller than an average grain size of the dielectric grains in the dielectric layer.

10. The multilayer electronic component of claim 1, wherein the side margin portion includes one or more dielectric grains having a core-shell structure.

11. The multilayer electronic component of claim 1, wherein an average size of the side margin portion in the third direction is 20 μm or less.

12. The multilayer electronic component of claim 1, wherein an average thickness of the dielectric layer is 0.35 μm or less.

13. The multilayer electronic component of claim 1, wherein an average thickness of the internal electrode is 0.35 μm or less.

14. The multilayer electronic component of claim 1, wherein the transition metal is Mn.

15. The multilayer electronic component of claim 1, wherein an average size of the side margin portion in the third direction is 15 μm or less.

16. The multilayer electronic component of claim 1, wherein an average thickness of the dielectric layer is 0.35 μm or less, an average thickness of the internal electrode is 0.35 μm or less, an average size of the side margin portion in the third direction is 20 μm or less, and the transition metal is Mn.

* * * * *